United States Patent

Hall

[11] Patent Number: 5,968,140
[45] Date of Patent: Oct. 19, 1999

[54] SYSTEM FOR CONFIGURING A DEVICE WHERE STORED CONFIGURATION INFORMATION IS ASSERTED AT A FIRST TIME AND EXTERNAL OPERATIONAL DATA IS ASSERTED AT A SECOND TIME

[75] Inventor: Jerald N. Hall, Scappoose, Oreg.

[73] Assignee: INTEL Corporation, Santa Clara, Calif.

[21] Appl. No.: 08/778,304

[22] Filed: Jan. 2, 1997

[51] Int. Cl.⁶ .................................................. G06F 13/12
[52] U.S. Cl. .............................. 710/14; 710/8; 710/10; 710/31
[58] Field of Search ........................... 395/653, 284, 395/828, 830, 800.37, 651, 652, 172, 173; 710/8, 10, 104; 712/43, 37; 713/1, 2, 100

[56] References Cited

U.S. PATENT DOCUMENTS

| | | | |
|---|---|---|---|
| 4,940,909 | 7/1990 | Mulder et al. | 307/465 |
| 4,980,850 | 12/1990 | Morgan et al. | 364/900 |
| 5,014,191 | 5/1991 | Padgaonkar et al. | 364/200 |
| 5,107,455 | 4/1992 | Haines et al. | 710/8 |
| 5,173,904 | 12/1992 | Daniels et al. | 371/22.3 |
| 5,267,309 | 11/1993 | Sanders et al. | 379/399 |
| 5,479,618 | 12/1995 | Van De Steeg et al. | 364/167.01 |
| 5,572,707 | 11/1996 | Rozman et al. | 395/497.01 |
| 5,606,715 | 2/1997 | Yishay et al. | 712/43 |
| 5,631,850 | 5/1997 | Tanaka et al. | 364/55.01 |
| 5,721,860 | 2/1998 | Stolt et al. | 395/432 |
| 5,737,235 | 4/1998 | Kean et al. | 364/490 |

*Primary Examiner*—Thomas C. Lee
*Assistant Examiner*—Chien Yuan
*Attorney, Agent, or Firm*—Blakely, Sokoloff, Taylor & Zafman LLP

[57] ABSTRACT

A programmable configuration selector is provided to an apparatus having at least one configurable device. The programmable configuration selector comprises a non-volatile memory having at least one storage register for storing configuration information corresponding to the at least one configurable device, and a multiplexer driver. The multiplexer driver comprises at least one output port coupled to the at least one configurable device, for asserting configuration information, received from the non-volatile memory, on the at least one output port to configure the at least one configurable device at a first time, and for asserting operational data, received from a data bus, on the at least one output port to the at least one configurable device at a second time.

20 Claims, 4 Drawing Sheets

SYSTEM FOR CONFIGURING A DEVICE WHERE STORED CONFIGURATION INFORMATION IS ASSERTED AT A FIRST TIME AND EXTERNAL OPERATIONAL DATA IS ASSERTED AT A SECOND TIME

BACKGROUND OF THE INVENTION

1. Field of the Invention

The present invention relates to the field of computer systems and, in particular, to a method and apparatus for the programmable configuration of strapping options on a circuit board assembly.

2. Background Information

Recognizing that "one size does not fit all" in the computer industry, many computer system manufacturers offer a wide variety of computer systems to satisfy a variety of markets and budgets. While such variety makes computer shopping convenient for consumers, the same product variety adds complexity to the manufacturing process which, when left unaddressed, may well result in quality and efficiency problems.

In an effort to improve efficiency and alleviate quality problems associated with the circuit board assembly process, many manufacturers have determined that it is more cost effective to settle on a few circuit board assembly "platforms". These platforms are essentially the same, or very similar, printed circuit board assemblies populated with similar components, wherein the operating configuration for a particular variety of printed circuit board is selectively configured through the use of alternate strapping devices. Jumper blocks, dual inline package (DIP) switches, double-pole single-throw (DPST) switches and, more recently, non-volatile memory devices are but a few examples of strapping devices which set the strapping options for a circuit board assembly.

As introduced above, strapping devices selectively set strapping options on a circuit board assembly "platform" to a produce a particular genre of circuit board assembly (i.e., a circuit board assembly suitable for a particular use/product). That is to say, the strapping devices provide an otherwise generic circuit board assembly with the "personality" characteristics (i.e., operating characteristics) commonly associated with a particular product. In, for example, computer system motherboards, strapping devices are often used to select the system bus clock speed and to indicate the bus/core ratio.

Furthermore, as microprocessor technology continues to improve, the size of the processor is continually being reduced. Consistent with the effort to reduce the real estate required by processors, many of the pins which interface the processor to the rest of the circuit board assembly are serving multiple roles. In other words, depending on the state of the processor, several pins on the processor may serve several different roles at different times. For example, some of the configuration information used to "set-up" a processor for operation is only required during the start-up process. Accordingly, certain pins may be used to perform one function during the start-up process, while serving another function during the normal operation of the processor. However, the static nature of prior art strapping devices make the use of these strapping devices unappealing in such implementations. Thus, processors have not been able to effectively use the dual-tasking feature of these inputs without the addition of external multiplexers, used to switch the processor pins to alternate circuit board input/output lines, based on the state of the circuit board assembly (i.e., start-up, shut-down, regular operation, etc.). The addition of the multiplexer into the processor support circuitry is a very costly solution, however, both in terms of additional components and real estate. One skilled in the art will appreciate that the nominal circuit board area gained by the dual-tasking pins is quickly eaten up with the addition of external multiplexers.

In addition to the quality and efficiency problems associated with prior art strapping devices, they do not lend themselves well to the upgrade of the circuit board assembly. For example, upgrading the central processing unit (CPU) to a higher performance processor may require that the strapping devices associated with the clock speed and bus/core ratio be updated to take advantage of the performance characteristics of the higher performance processor. With many of the common prior art strapping devices, the strapping options are set by hand by a service technician. Just as in the manufacturing process, the manual configuration of strapping devices in this manner is prone to human error and mechanical failure.

Thus a need exists for a method and apparatus for the programmable configuration of strapping options unencumbered by the deficiencies and limitations associated with the prior art.

SUMMARY OF THE INVENTION

In accordance with the teachings of the present invention, a method and apparatus for the programmable configuration of strapping options is disclosed. A programmable configuration selector (PCS) is provided to an apparatus having at least one configurable device. The PCS comprises a non-volatile memory having at least one storage register for storing configuration information corresponding to the at least one configurable device, and a multiplexer driver. The multiplexer driver comprises at least one output port coupled to the at least one configurable device, for asserting configuration information, received from the non-volatile memory, on the at least one output port to configure the at least one configurable device at a first time, and for asserting operational data, received from a data bus, on the at least one output port to the at least one configurable device at a second time.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. Furthermore, for ease of understanding, certain method steps are delineated as separate steps, however, these separately delineated steps should not be construed as necessarily order dependent in their performance.

Figure 1:
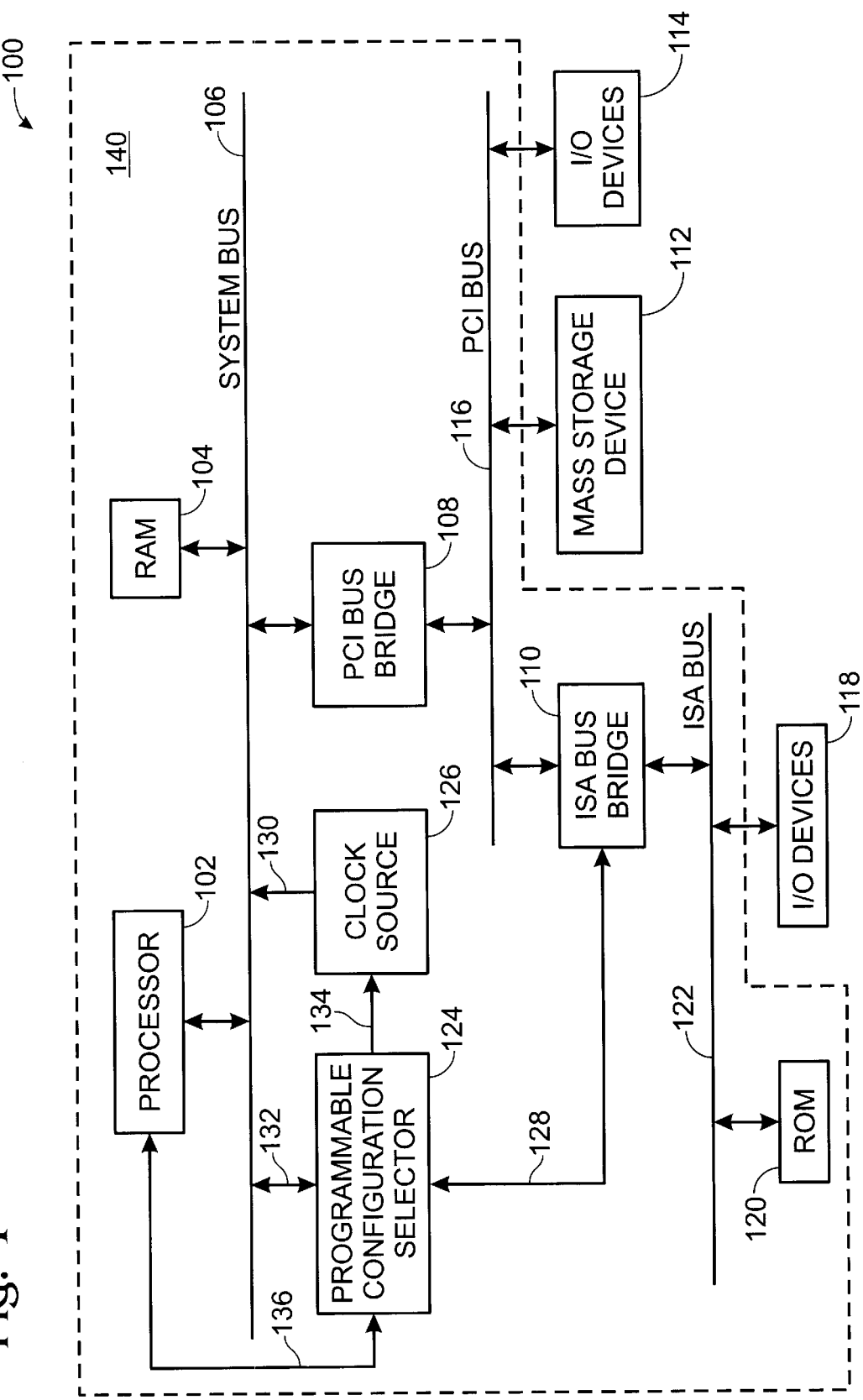
FIG. 1 is a block diagram illustrating an exemplary computer system incorporating the teachings of the present invention.

Referring now to FIG. 1, a block diagram illustrating an exemplary computer system 100 is depicted incorporating the teachings of the present invention. In particular, exemplary computer system 100 is configured to programmably select the strapping options for computer system 100. As illustrated in FIG. 1, exemplary computer system 100 is shown comprising circuit board assembly 140 including processor 102, random access memory 104, clock source 126 and, in accordance with the teachings of the present invention, programmable configuration selector 124, each of which is coupled to system bus 106 as depicted. As will be described in further detail with reference to FIGS. 2–7, programmable configuration selector 124 configures configurable devices on circuit board assembly 140 to exploit the operating characteristics of computer system 100. In one embodiment, for example, configuration selector 124 configures clock source 126 to output a particular system clock frequency, and selectively configures processor 102 with bus/core ratio configuration information during power-up and reset states of exemplary computer system 100.

With continued reference to exemplary computer system 100 of FIG. 1, bridge 108 is also coupled to system bus 106 for coupling system bus 106 to one or more, typically input/output (I/O), buses. In one embodiment, this bus is a Peripheral Component Interconnect (PCI) bus 116. As depicted, PCI bus bridge 108 couples system bus 106 to PCI bus 116. A mass storage device 112 such as a magnetic or optical disk is coupled with PCI bus 116 for storing information and instruction for processor 102. I/O devices 114 are also coupled to PCI bus 116 which input and output data and control information to and from processor 102. I/O devices 114 may include, for example, a display device, and alphanumeric input device including alphanumeric and function keys, and a cursor control device. A hard copy device such as a plotter or printer may also be included in the devices cumulatively referred to as I/O devices 114 for providing a visual representation of computer images, or a network adapter device may be included in the I/O devices 114 for coupling exemplary computer system 100 to a computer network, such as a Local Area Network (LAN).

In one embodiment, PCI bus 116 is also coupled to an Industry Standard Architecture (ISA) bus 122 via ISA bus bridge 110. A read-only memory (ROM) 120 is coupled to ISA bus 122 for storing static information and instructions for processor 102. I/O devices 118 may also be coupled to ISA bus 122 which input and output data and control information to and from processor 102. These I/O devices 118 may include some of the same devices as illustrated in I/O devices 114 discussed above. In accordance with the teachings of the present invention, ISA bus bridge 110 is configured to communicate with programmable configuration selector 124 via bus 128. In one embodiment, the communication between ISA bus bridge 110 and programmable configuration selector 124 complies with the I²C™ standard two-wire communications bus protocol developed by Philips Semiconductor, of Sunnyvale, Calif. An expanded explanation of the communication between ISA bus bridge 110 and programmable configuration selector 124 will be presented with reference to FIGS. 3, 4, 5 and 6.

As will be appreciated by those skilled in the art, except for the programmable configuration and assertion of strapping options by programmable configuration selector 124 and its associated control bus and data lines, elements 102 through 136 perform their conventional function as known in the art. In addition, except for I/O devices 114 and 118, and mass storage device 112, elements 102–136 of exemplary computer system 100 are disposed on circuit board assembly 140 (often referred to as a motherboard). Furthermore, exemplary computer system 100 is intended to represent a broad category of computing devices having strapping options.

Figure 2:
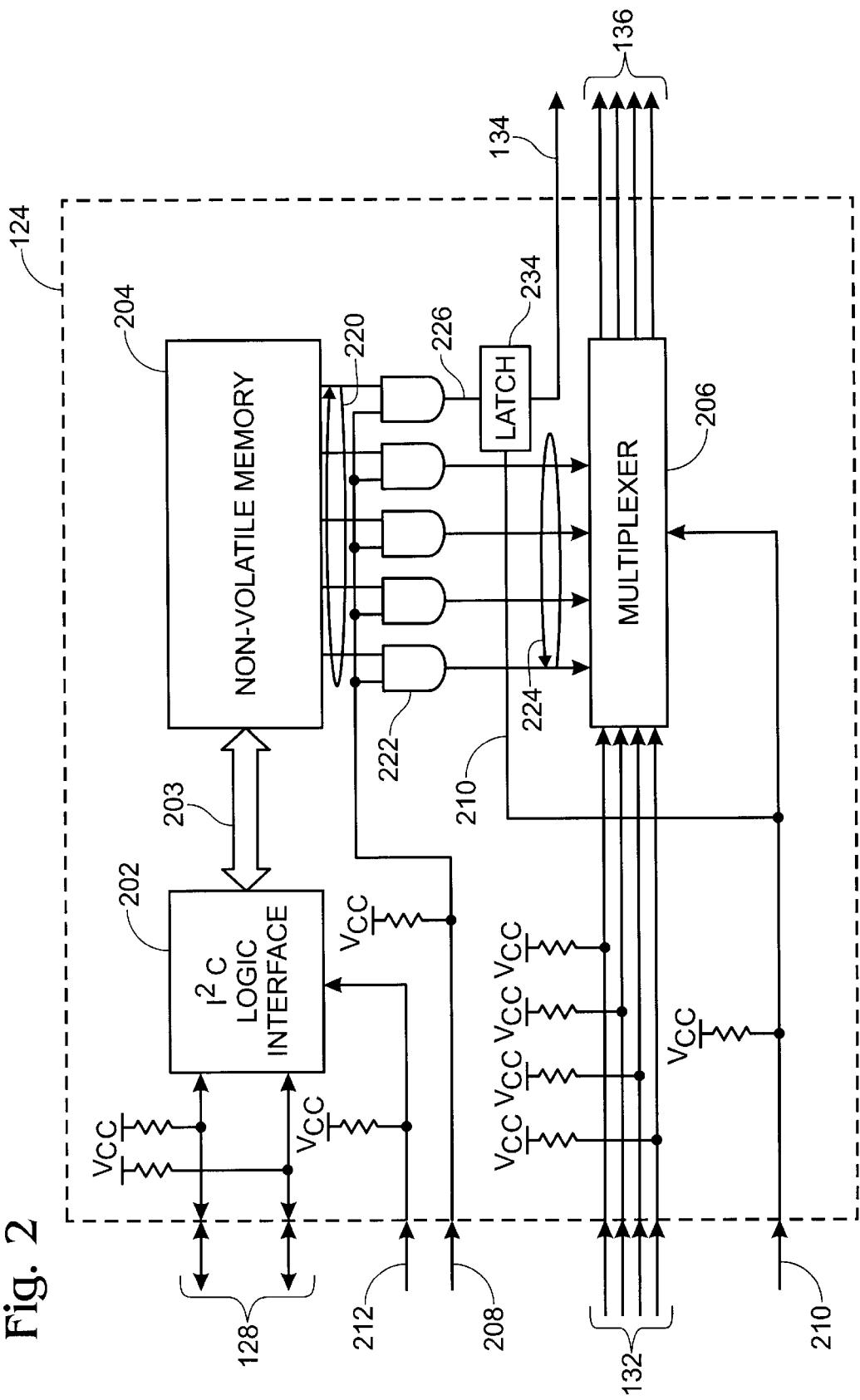
FIG. 2 is a block diagram illustrating a more detailed view of the programmable configuration selector depicted in FIG. 1, in accordance with one embodiment of the present invention.

Turning next to FIG. 2, a block diagram illustrating an expanded view of programmable configuration selector 124, incorporating the teachings of the present invention, for programmably configuring the strapping options of exemplary computer system 100, is illustrated. In FIG. 2 programmable configuration selector 124 is shown comprising I²C interface logic 202, non-volatile memory 204 and multiplexer driver 206. In one embodiment, non-volatile memory 204 is comprised of an electrically erasable programmable read-only memory (i.e., an EEPROM (E²PROM)).

As illustrated, interface logic 202 communicates with non-volatile memory 204 via bus 203. Non-volatile memory 204 has a plurality of output pins 220, each of which is coupled to one input of a corresponding plurality of logic AND gates 222. Of the plurality of logic AND gates 222, the output 224 of a first subset are coupled to multiplexer driver 206, while the output 226 of a second subset are coupled to latch 234. The output of latch is coupled to non__muxed__ output 134, while the output of multiplexer driver 206 is coupled to mux__output 136. In addition, programmable configuration selector 124 receives input from I²C bus 128, write protect input 212, override# input 208, mux__select input 210, as well as external data input lines 132, while further comprising non__mux__output 134 and mux__output 136.

As illustrated in FIGS. 1 and 2, programmable configuration selector 124 is coupled to ISA bus bridge 110 with I²C bus 128, which comprises a bi-directional data line and a clock line. The data line of the I²C bus 128 supplies data with which non-volatile memory 204 is programmed, while the clock line supplies a clock signal. The communication protocol utilized by programmable configuration selector 124 will be described in further detail with reference to FIGS. 3, 4 and 5. In addition to I²C bus 128, programmable configuration selector 124 also receives control signals via write protect input 212, override# input 208, and mux__ select input 210.

With continued reference to FIG. 2, write protect input 212 is coupled to I²C logic interface 202. When asserted (i.e., input logic "1") write protect input 212 prohibits data from being written from the data line of I²C bus 128 to the registers of non-volatile memory 204. Override# input 208 is coupled to one input of the plurality of logic AND gates 222, while the other input for each of the plurality of logic AND gates 222 is coupled to the output 220 of non-volatile memory 204. As depicted, override# input 208 is an active low control line which works in combination with mux__ select input 210 to control the output of programmable configuration selector 124, as illustrated below in Table 1.

TABLE 1

Programmable Configuration Selector Output Functional Truth Table

| OVERRIDE # | Mux_Select Input | Mux_Output | Non_Muxed_Output |
| --- | --- | --- | --- |
| 0 | 0 | All "0's" | All "0's" |
| 0 | 1 | Ext. Data Lines | Latched non_mux_output |
| 1 | 0 | Non-volatile memory | Non-volatile memory |
| 1 | 1 | Ext. Data Lines | Latched non_mux_output |

As depicted in Table 1, when the mux_select input 210 is logic 0 (i.e., during power-up and reset states of exemplary computer system 100), multiplexer driver 206 will select the data from non-volatile memory 204 to drive on mux_output 136. Alternatively, when mux_select input is a logic 1 (i.e., during normal operational states of exemplary computer system 100), multiplexer driver 206 will select operational data from the external data input lines 132 to drive on mux_output 136. The input signal of mux_select input 210 is also used to trigger latch 234. Latch 234 is transparent when mux_select input 210 is set to a logic 0. In other words, whatever input is resident on the input line to latch 234 during the transition from a 1 to 0 of mux_select input 210 will be asserted on non_muxed_output 134, regardless of the contents of non-volatile memory 204. Alternatively, when mux_select input 210 transitions from a 0 to a 1, the contents of non-volatile memory 204 will be asserted on non_muxed_output 134.

An exception to the foregoing functional description exists, however, when override# input 208 is set to logic 0, which sets the output of programmable configuration selector 124 in a default state in which the configurable devices are set to a nominal operating state. As illustrated in Table 1, when the active low override# input 208 (where # denotes an active low trigger) and the state of mux_select input 210 are both a logic 0, all of the outputs of programmable configuration selector 124 (i.e., non_muxed_output 134 and mux_output 136) will be driven to logic 0. In one embodiment, the assertion of logic 0 on the output of programmable configuration selector 124 configures the strapping options to a default operating level.

Figure 3:
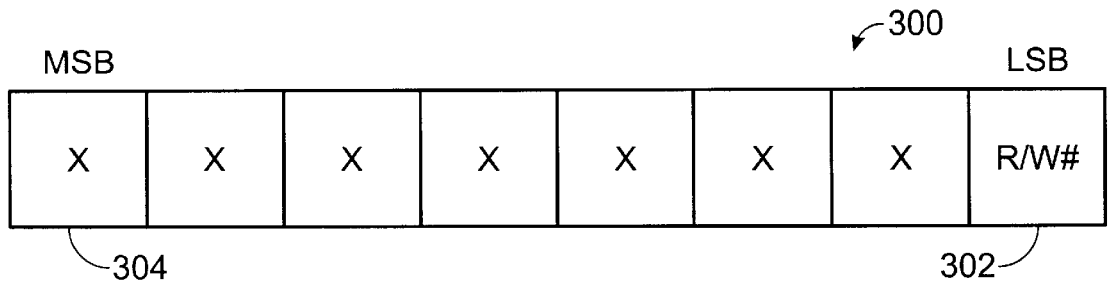
FIGS. 3, 4, and 5 illustrate an example of an eight-bit address byte, an eight-bit data byte and an example communication transaction suitable for use in communicating with the programmable configuration selector of FIG. 2.
Figure 4:
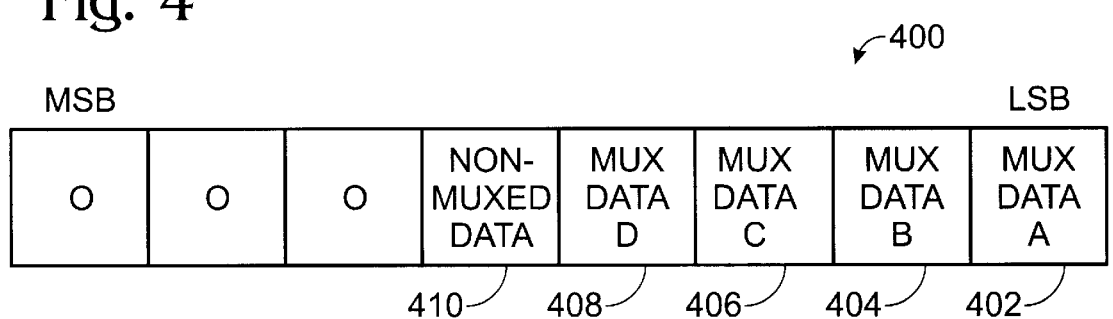
Figure 5:
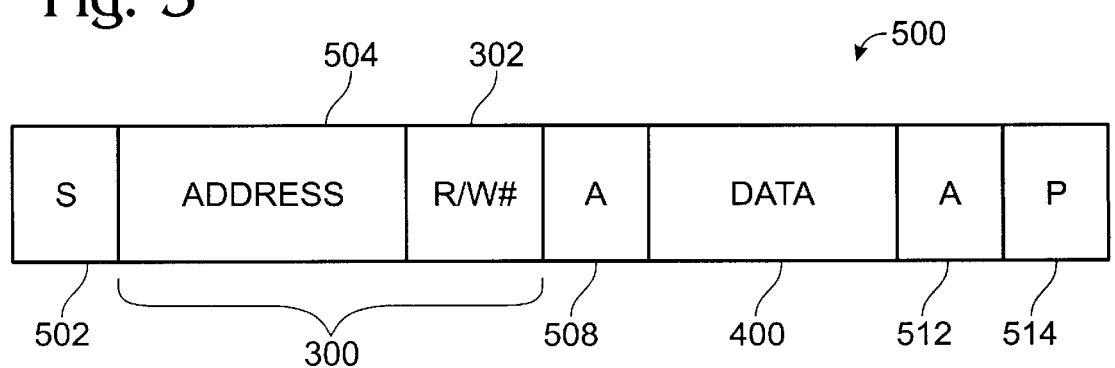

Having described the operation of programmable configuration selector 124 with reference to FIGS. 1 and 2, the operation of the programming feature will next be described with continued reference to FIGS. 1 and 2, and with further reference to FIGS. 3, 4 and 5. As introduced above, one of the beneficial features of programmable configuration selector 124 is that it may be re-programmed to accommodate changes or upgrades in exemplary computer system 100. FIGS. 3, 4 and 5 depict an example communication protocol used by ISA bus bridge 110 to program configuration information into non-volatile memory 204 of programmable configuration selector 124. In one embodiment, ISA bus bridge 110 communicates with interface logic 202 via I$^2$C bus 128, in accordance with the I$^2$C communication protocol depicted in FIGS. 3, 4 and 5. In the I$^2$C bus communication protocol, each agent on I$^2$C bus 128 is addressable with a unique seven-bit address.

FIG. 3 depicts an example address byte 300 including most significant bit (MSB) 304 and least significant bit (LSB) 302. The seven most significant bits comprise the address, while LSB 302 determines whether the function is a read or write of non-volatile memory 204, with a logic 1 denoting a read function and a logic 0 denoting a write function. It should be noted, however, that an actual write of data to non-volatile memory 204 is also controlled by write protect input 212. In other words, although LSB 302 may be set to logic 0, a write of data from the data line of I$^2$C bus 128 will not occur unless the state of write protect input 212 is also a logic 0.

FIG. 4 depicts an example data byte 400 in accordance with the I$^2$C protocol, suitable for use by programmable configuration selector 124. As illustrated in FIG. 4, the three most significant bits of data byte 400 are programmed with logic 0's. The least significant five bits are programmed into five registers of non-volatile memory 204. Thus, bit 410 contains information to be asserted on non_mux_output 134, while bits 402–408 contain information to be asserted on mux_output 136.

FIG. 5 depicts an example I$^2$C read/write data stream 500, including address byte 300 and data byte 400, for communicating between ISA bus bridge 110 and programmable configuration selector 124 via I$^2$C bus 128. As illustrated, communication with programmable configuration selector 124 is initiated with a start condition (S) 502 sent by ISA bus bridge 110. Next, the seven address bits 504 of address byte 300 are sent followed by read/write# bit 302, which indicates the type of transaction (i.e., read (1) or write (0)). An acknowledge condition (A) 508 is sent by programmable configuration selector 124 to ISA bus bridge 110 after address byte 300 has been sent. Next, data byte 400 is sent/received by ISA bus bridge 110, depending on the transaction type denoted by read/write# bit 302. Following data byte 400, another acknowledge condition (A) 512 is sent by programmable configuration selector 124. Having received acknowledge condition (A) 512, ISA bus bridge 110 sends stop condition (P) 514, wherein if the cycle is a write (i.e., read/write# bit is a logic "0"), stop condition (P) 514 will cause the write of data byte 400 into non-volatile memory 204, so long as write protect input 212 is a logic "0". If, however, write protect input 212 is enabled (i.e., logic 1), the write operation is transacted normally, but upon receipt of stop condition (P) 514, the actual write of data byte 400 will be ignored by the programmable configuration selector 124, and the configuration information stored in non-volatile memory 204 is left unchanged.

Figure 6:
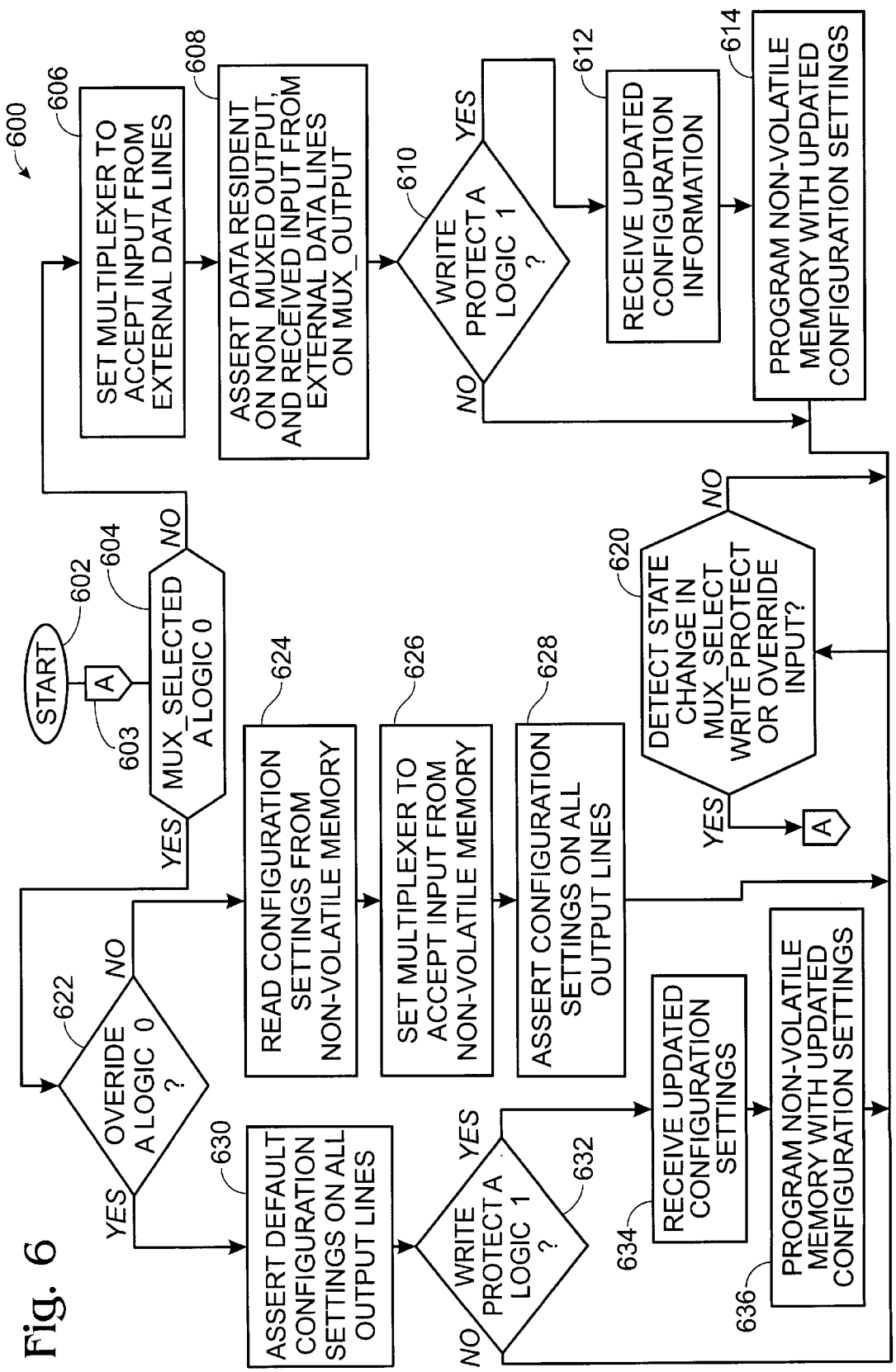
FIG. 6 is a flow chart illustrating an example method of operation for the programmable configuration selector of FIG. 2.

Turning now to FIG. 6, a flow chart illustrating an example method for configuring the strapping options of a circuit board assembly in accordance with the teachings of the present invention is shown. In particular, FIG. 6 illustrates one method depicting the several modes of operation of programmable configuration selector 124 depicted in FIG. 2. As depicted, method 600 begins in step 602, wherein power is applied to circuit board assembly 140 including programmable configuration selector 124. A determination is made, in step 604, as to whether mux_select input 210 is a logic 1, or a logic 0, thereby determining the input from which multiplexer driver 206 will drive mux_output 136.

If, in step 604, a logic 1 is detected multiplexer driver 206 is set to accept input from external data lines 132, in step 606. In step 608, multiplexer driver 206 asserts information received from external data lines 132 on mux_output 136, while programmable configuration selector 124 further asserts configuration information resident on the non_muxed_output 134, without a read of non-volatile memory 204. Having asserted the configuration information in step 608, a determination is subsequently made as to whether active low write protect input 212 is a logic 1, in step 610. If so, interface logic 202 receives updated configuration information settings via I$^2$C bus 128, in step 612. In step 614, the updated configuration settings are written by interface logic 202 to the individual registers of non-volatile memory 204 via bus 203. Once the update configuration information has been stored in non-volatile memory 204, a determination is made in step 620 as to whether a state change has occurred in mux_select input 210, override# input 208 or write protect input 212. If so, the method loops back to point 603 and the process repeats. If no state change is detected, the process continues to monitor the input control lines for changes by repeating step 620 until a state change is detected. Similarly, if in step 610 it is determined that write protect input 212 is a logic 0, thereby prohibiting a write to non-volatile memory 204, the method skips to step 620, wherein the method monitors the several inputs for state changes.

Returning to step 604, if it is determined that the input state for mux_select input 210 is a logic 0, a further determination is made in step 622 as to whether the active low override# input 208 is a logic 0. If not, the configuration settings are read from non-volatile memory 204 in step 624. In step 626, multiplexer driver 206 is set to accept input from non-volatile memory 204. In step 628, configuration settings received by multiplexer driver 206 from non-volatile memory 204 is asserted on mux_output 136, while programmable configuration selector further asserts information read from non-volatile memory 204 on non_muxed_output 134. Having asserted the configuration settings in step 628, the method returns to step 620 to monitor input lines for state changes.

If, however, in step 622 a logic 0 is detected on override# input 208, default configuration settings are asserted on all outputs (i.e., non_muxed_output 134 and mux_output 136), in step 630. Having asserted the default configuration settings in step 630, a determination is made as to whether write protect input 212 is a logic 1 in step 632. If so, interface logic 202 reads updated configuration information from I$^2$C bus 128 in step 634. In step 636, the updated configuration information is written to non-volatile memory 204 by interface logic 202 via bus 203. Having updated the configuration settings of non-volatile memory 204 in step 636, or if in step 632 a logic 0 is detected, the process returns to step 620 wherein the method continues to monitor the control inputs (i.e., write protect input 212, override# input 208 and mux_select input 210) for state changes.

Therefore, in accordance with the teachings of the present invention, programmable configuration selector 124 provides an apparatus with the flexibility to accommodate upgraded processors and support agents. Additionally, this feature supports the ability for programmable configuration selector 124 to receive and store updated configuration settings as appropriate.

Thus, alternative embodiments for a method and apparatus for the programmable configuration of strapping options on a circuit board assembly have been described. While the method and apparatus of the present invention has been described in terms of the above illustrated embodiments, those skilled in the art will recognize that the invention is not limited to the embodiments described. For example, although FIGS. 1, 2 and 7 depict programmable configuration selector 124 configuring configurable devices (i.e., clock source 126 and the bus/core ratio) to function with processor 102, those skilled in the art will appreciate that this is by example only, and that programmable configuration selector 124 may be used to configure the strapping option for a broad range of configurable devices. In alternate embodiments programmable configuration selector 124 may be used to configure remote control devices such as those used for video cassette recorders, televisions or automatic garage door openers. Thus, the present invention can be practiced with modification and alteration within the spirit and scope of the appended claims. Accordingly, the descriptions thereof are to be regarded as illustrative instead of restrictive on the present invention.

What is claimed is:

1. An apparatus to selectively configure at least one configurable device, the apparatus comprising:
    a memory having at least one storage register to store configuration information for the at least one configurable device; and
    a multiplexer driver, having at least one output port coupled to the at least one configurable device, to assert the stored configuration information on the at least one output port to configure the at least one configurable device at a first time, and to assert operational data received from a communicatively coupled external source to the at least one configurable device at a second time.

2. The apparatus of claim 1, wherein the memory is an electrically erasable programmable read-only memory (EEPROM).

3. The apparatus of claim 1, further comprising an interface logic, coupled to an input bus, to receive configuration information corresponding to the at least one configurable device, and to write said configuration information to the at least one storage register in the memory.

4. The apparatus of claim 3, wherein the input bus to which the interface logic is responsive comprises an I$^2$C compatible bus.

5. The apparatus of claim 3, further comprising a write protect input line, coupled to the interface logic, which when asserted disables interface logic from writing said configuration information to said memory.

6. The apparatus of claim 1, further comprising an override input, which when asserted configures the at least one configurable device to a default setting.

7. The apparatus of claim 6, further comprising a second output port, coupled to the memory and the override input, to configure a second communicatively coupled configurable device.

8. The apparatus of claim 1, further comprising a mux_select input, coupled to the multiplexer driver, to couple the output port to either the data bus or the non-volatile memory based, at least in part, on the state of the mux_select input.

9. A system comprising:
    at least one configurable device having a plurality of alternative configurations; and
    a programmable configuration selector, coupled to the at least one configurable device, to configure the at least one configurable device to one of the plurality of alternative configurations, the programmable configuration selector comprising:
        a memory having at least one storage register to store configuration information for the at least one configurable device; and a multiplexer driver, having at least one output port coupled to the at least one configurable device, to assert the stored configuration information on the at least one output port to configure the operating characteristics of the at least one configurable device at a first time, and to assert operational data on the at least one output port received from a communicatively coupled external device to the at least one configurable device at a second time.

10. The system of claim 9, wherein the programmable configuration selector further comprises interface logic, coupled to an input bus, to receive configuration information corresponding to the at least one configurable device, and to write said configuration information to the at least one storage register in the memory.

11. The system of claim 10, further comprising a write protect input line, coupled to the interface logic, which when asserted disables the interface logic from writing configuration information to the memory.

12. The system of claim 10, wherein the input bus to which the interface logi is responsive comprises an I²C compatible bus.

13. The system of claim 9, further comprising an override input line coupled to the programmable configuration selector, which when asserted configures the at least one configurable device to a default setting.

14. The system of claim 9, wherein the programmable configuration selector further comprises a second output port, responsive to the non-volatile memory and the override input line, to configure a second configurable device.

15. The system of claim 9, further comprising a mux_select input, coupled to the multiplexer driver, to couple the output port to either the non-volatile memory or the data bus based, at least in part, on the state of the mux_select input.

16. In a system including at least one configurable device and a programmable configuration selector, a method for selectively configuring the at least one configurable device comprising:

(a) receiving configuration information at a first multiplexer input port from a communicatively coupled memory;

(b) controlling the multiplexer to selectively accept input data from either the first multiplexer input port, or from an external source communicatively coupled to a second multiplexer input port; and (c) asserting the input data received from the first multiplexer input port to the at least one configurable device at a first time to configure the configurable device, and from the second multiplexer input port to the at least one configurable device at a second time providing the configurable device with operational data.

17. The method of claim 16, wherein step (c) comprises:

(c.1) asserting input data received by the multiplexer from the non-volatile memory to the at least one configurable device at a first time, wherein the input data includes configuration information; and (c.2) asserting input data received the second multiplexer input port from the external source to the at least one configurable device at a second time, wherein the input data is comprised of operational data.

18. The method of claim 17, wherein the at least one configurable device is a processor.

19. The method of claim 16, further comprising (d) asserting configuration information from the to a second configurable device.

20. The method of claim 16, wherein (b) comprises:

(b.1) automatically switching the multiplexer to accept input from the first multiplexer input port, coupled to the memory, during power-up and reset states of the computer system; and (b.2) automatically switching the multiplexer to accept input from the external source coupled the second multiplexer input port during other operational states of the computer system.

* * * * *